No. 867,730.
PATENTED OCT. 8, 1907.
H. JEFFREYS.
RULE.
APPLICATION FILED APR. 12, 1907.
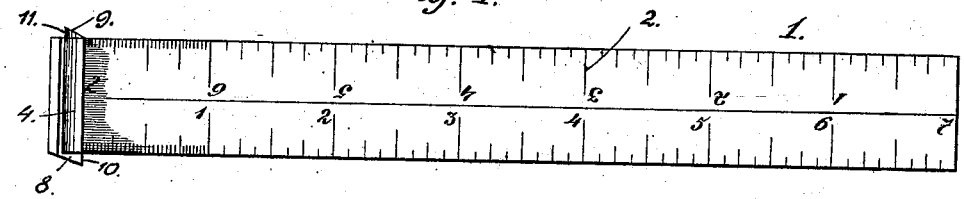
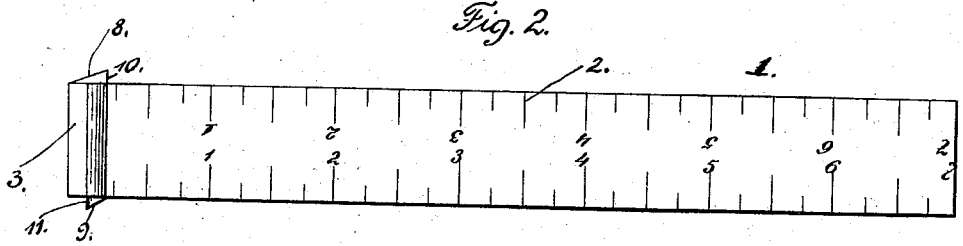
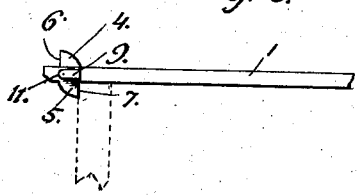
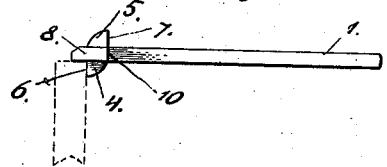
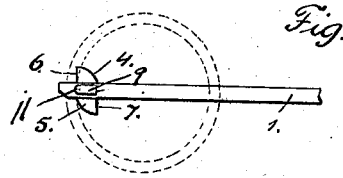
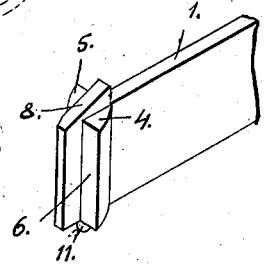
WITNESSES:
A. H. Rabság,
INVENTOR
Henry Jeffreys,
BY
Attorneys

UNITED STATES PATENT OFFICE.

HENRY JEFFREYS, OF WEST SALISBURY, PENNSYLVANIA.

RULE.

No. 867,730.   Specification of Letters Patent.   Patented Oct. 8, 1907.

Application filed April 12, 1907. Serial No. 367,879.

*To all whom it may concern:*

Be it known that I, HENRY JEFFREYS, a citizen of the United States of America, residing at West Salisbury, in the county of Somerset and State of Pennsylvania, have invented certain new and useful Improvements in Rules, of which the following is a specification, reference being had therein to the accompanying drawing.

This invention relates to rules, and the invention has for its object to provide a rule with novel means for steadying and positioning one end of the rule in order that an accurate measurement can be obtained by the rule.

Another object of this invention is to construct a rule or measuring device with lugs and ridges at its one end, whereby the end of the rule can be firmly held in engagement with an object and while a measurement is being determined.

With the above and other objects in view, which will more readily appear as the invention is better understood, the same consists in the novel construction, combination and arrangement of parts to be hereinafter more fully described and then specifically pointed out in the appended claims.

Referring to the drawing forming part of this specification, like numerals of reference designate corresponding parts throughout the several views, in which:

Figure 1 is an elevation of one side of my improved rule, Fig. 2 is an elevation of the opposite side, Fig. 3 is an edge view of a portion of the rule illustrating the manner in which the same is used to obtain an outside measurement, Fig. 4 is a similar view illustrating the manner of obtaining an inside measurement, Fig. 5 is a similar view illustrating the manner of obtaining the inner diameter of a tube or pipe, Fig. 6 is a perspective view of the end of a rule constructed in accordance with my invention.

In the accompanying drawings, I have illustrated an ordinary rule 1 having graduations 2 upon both sides thereof, said rule being constructed of wood, celluloid, metal or any suitable durable material.

My invention resides in locating near the beveled end 3 of the rule, two side ridges 4 and 5 having shoulders 6 and 7 respectively, said shoulders being oppositely disposed with relation to one another.

The edges of the rule are provided with integral beveled lugs 8 and 9 having shoulders 10 and 11 respectively. The faces of the shoulders 7 and 10 aline with each other and with the zero graduation or beginning point of the rule scale upon one side of the rule as shown in Fig. 1, and the opposite facing shoulders 6 and 11 are in alinement with each other and with the beginning point of the graduations upon the opposite side of the rule (Fig. 2). All of the described shoulders form right angles at their line of meeting with the rule surfaces, thus enabling my rule to be employed as a T-square and straight edge. To further facilitate its use the edges of my rule may also be graduated.

The manner of using my improved rule is illustrated in Figs. 3, 4 and 5. Assuming that it is desired to obtain the width of a piece of material (see Fig. 3), the ridge 5 is placed in engagement with one side of the material, the shoulder 7 of said ridge bearing upon the side of the material while the rule lies upon the edge thereof. The rule will be firmly positioned upon the material whereby an accurate measurement will be readily obtained.

When it is desired to ascertain the distance from one piece of material to another piece of material or object, the shoulder 6 of the ridge 4 is placed in engagement with the side of the piece of material, the end of the rule overlying the edge of the material to steady the rule and hold the same in approximately a horizontal plane whereby the scale shown in Fig. 2 may be read to ascertain a correct measurement.

To obtain the diameter of a pipe or tube (see Fig. 5), the shoulder 11 of the lug 9 is placed in engagement with the inner side of a tube or pipe, the edge of the rule bearing against the end of the pipe. It will thus be seen that an accurate measurement can be made in order to determine the interior diameter of a pipe. The outer diameter can be easily ascertained by placing the shoulder 10 of the lug 8 upon the outer edge of the pipe at the end thereof.

My invention facilitates the rapid manipulation of a rule when determining various measurements, and the improvement can be readily embodied upon rules or measuring devices of various designs.

What I claim and desire to secure by Letters Patent, is:—

A rule having graduated sides, ridges carried by the sides of said rule and spaced from one end thereof, and having oppositely disposed shoulders, and lugs carried by the edges of said rule adjacent to said ridges and having shoulders oppositely disposed at right angles to the rule edges, the faces of each pair of similarly disposed shoulders alining with each other and with the zero graduation upon opposite sides of the rule.

In testimony whereof I affix my signature in the presence of two witnesses.

HENRY JEFFREYS.

Witnesses:
W. M. KNECHT,
JOHN A. KNECHT.